United States Patent Office 2,724,815
Patented Nov. 22, 1955

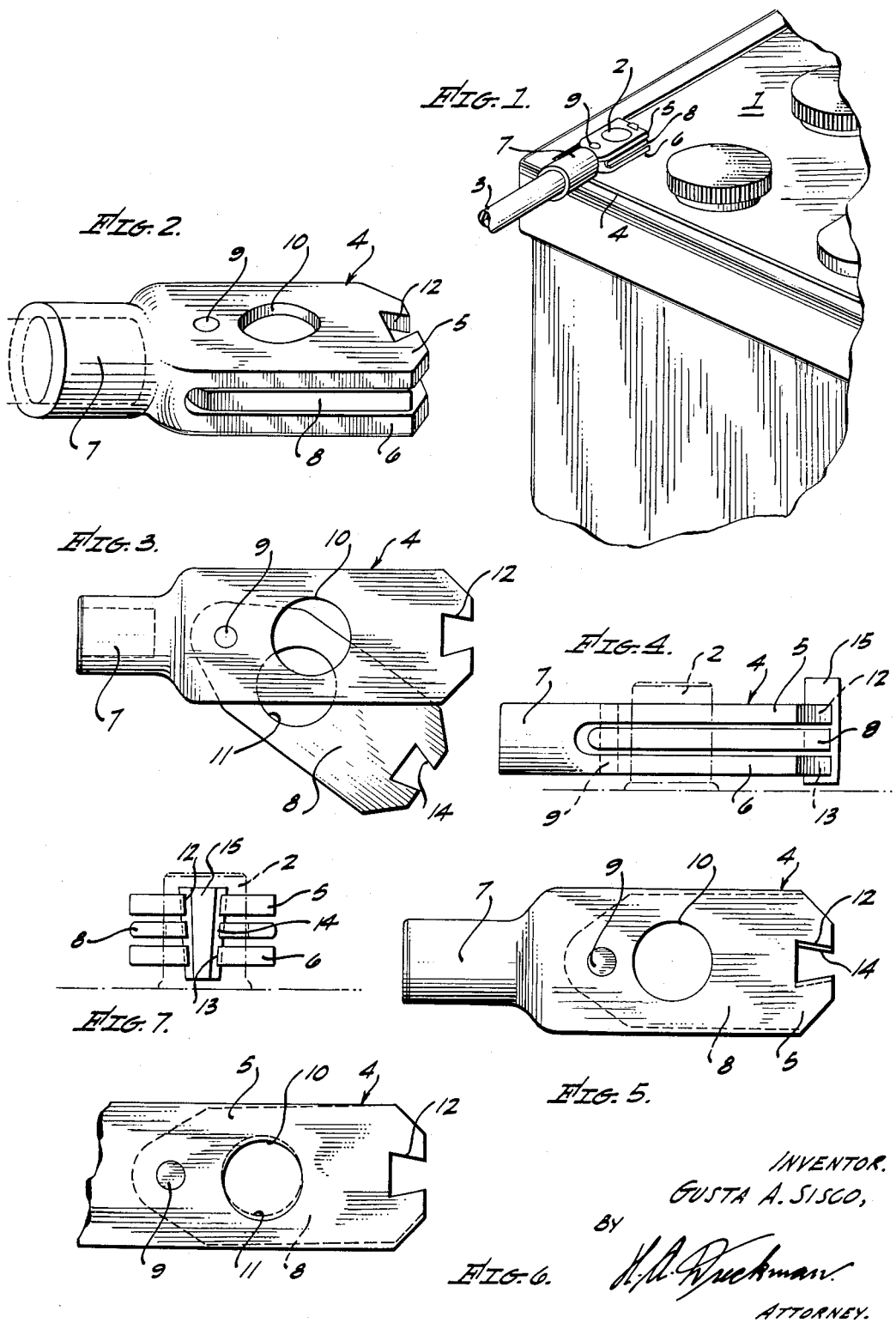
Nov. 22, 1955 — G. A. SISCO — 2,724,815
BATTERY TERMINAL CLAMP
Filed April 6, 1953
INVENTOR.
GUSTA A. SISCO,
BY
ATTORNEY.

2,724,815
BATTERY TERMINAL CLAMP
Gusta A. Sisco, Oildale, Calif.

Application April 6, 1953, Serial No. 346,866

2 Claims. (Cl. 339—240)

This invention relates to a battery terminal clamp whereby a cable may be effectively attached to the terminal of a battery.

An object of my invention is to provide a novel clamp construction whereby a pivotally mounted blade is wedged tightly against the battery terminal by means of a tapered wedge which is driven into suitable grooves to receive the same.

Another object of my invention is to provide a novel battery terminal clamp of the character stated in which the clamp can be quickly and easily attached to or removed from the battery terminal as may be desired.

Another object of my invention is to provide a pivotally mounted locking blade in a bifurcated body, the blade being wedged to one side, thereby engaging and clamping the battery terminal.

Still another object of my invention is to provide a novel battery terminal clamp of the character stated, which is simple in construction, inexpensive to manufacture and effective in use.

Other objects, advantages and features of invention may appear from the accompanying drawing, the subjoined detailed description and the appended claims.

In the drawing:

Figure 1 is a fragmentary perspective view of an electrical battery with my clamp attached thereto.

Figure 2 is a perspective view of the battery clamp.

Figure 3 is a top plan view of the same.

Figure 4 is a side elevation of the same.

Figure 5 is a top plan view of the clamp showing the holes in aligned position.

Figure 6 is a fragmentary plan view similar to Figure 5 but showing the holes in a clamping position.

Figure 7 is an end view of the clamp.

Referring more particularly to the drawing, the numeral 1 indicates an electrical battery of usual and well known construction which includes a terminal post 2. To attach the battery cable 3 to the post 2, I provide a clamp which includes a bifurcated body 4, this body including integrally formed upper and lower plates 5 and 6. A hub 7 is integrally formed with the body 4 and at one end thereof and this hub is hollow for the purpose of receiving the cable 3. A locking blade 8 is pivotally mounted between the plates 5 and 6 on a pin 9 which extends through the plates 5 and 6 and through the blade.

The plates 5 and 6 each have a hole 10 therein and these holes are aligned for the purpose of receiving the terminal 2 of the body. The blade 8 is also provided with a hole 11 which can be aligned with the holes 10 so that the terminal post 2 will extend through these holes subsequently as shown in Figures 1 and 4. In order that the clamp may be securely held on the terminal 2, it is necessary to wedge the blade 8 to one side, thus causing a slight misalignment of the hole 11 with the holes 10, thereby securely clamping the terminal post. This is accomplished as follows: The plates 5 and 6 are each provided with a notch or groove 12—13 respectively, and these grooves are in vertical alignment. The blade 8 is also provided with a groove 14 which can be aligned with the grooves 12 and 13 when the wedge 15 is driven through all of the grooves. When the holes 10 and 11 are in alignment the groove 14 is misaligned with the grooves 12—13. When the wedge 15 is driven into place through these grooves the hole 11 will be misaligned with the holes 10, as shown in Figure 6, thus effectively clamping the battery post 2.

Having described my invention, I claim:

1. A battery terminal clamp comprising a bifurcated body, including spaced plates and a hub, said hub having a recess therein to receive a cable, a blade pivotally mounted between said plates, said plates and the blade each having a hole extending therethrough to receive a battery terminal, each of said plates having a groove formed in the outer ends thereof, said grooves being in alignment, said blade having a groove in the outer end thereof, and a wedge adapted to be driven into all of said grooves whereby the blade is wedged to one side to clamp the battery terminal.

2. A battery terminal clamp comprising a bifurcated body formed with spaced upper and lower plates, an integral hub, said hub being hollow to receive a cable, a blade mounted between said plates, a pivot pin extending through the plates and the blade on which the blade is pivoted, said plates and the blade each having a hole extending therethrough through which the battery terminal extends, each of said plates and the blade having a groove in the outer ends thereof, the groove in the blade being misaligned with the grooves in the plates when said holes in the plates and the hole in the blade are aligned and a wedge adapted to fit in said grooves to wedge the blade to one side and clamp the battery terminal.

References Cited in the file of this patent

UNITED STATES PATENTS

| | | |
|---|---|---|
| 1,920,608 | Thompson | Aug. 1, 1933 |
| 1,927,449 | Abels | Sept. 19, 1933 |
| 2,027,120 | Rocheleau | Jan. 7, 1936 |
| 2,092,372 | Goeller | Sept. 7, 1937 |
| 2,234,222 | Baerer | Mar. 11, 1941 |

FOREIGN PATENTS

| | | |
|---|---|---|
| 400,731 | Great Britain | Nov. 2, 1933 |